United States Patent Office 3,108,147
Patented Oct. 22, 1963

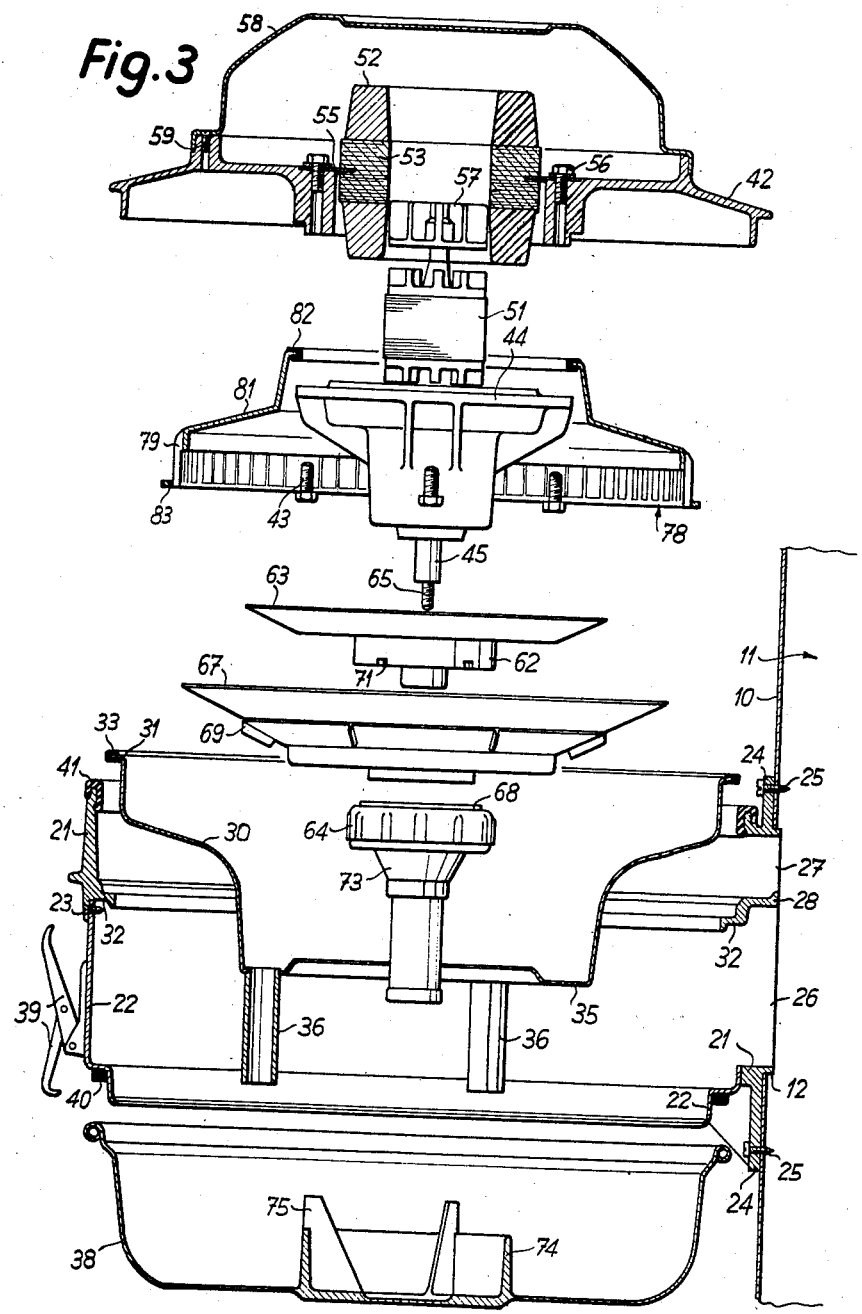

3,108,147
APPARATUS FOR HUMIDIFYING AIR
Karl Flury, Adliswil, Zurich, Switzerland, assignor to Defensor Aktiengesellschaft, Zurich, Switzerland
Filed Apr. 29, 1959, Ser. No. 809,756
Claims priority, application Switzerland Jan. 21, 1959
1 Claim. (Cl. 261—29)

The present invention relates to an apparatus for humidifying air, which serves for instance for the heating of rooms of buildings.

Apparatus of this kind are known which have a liquid atomizer arranged on a carrier, for instance an airduct, whose casing possesses an inlet opening for the air and an outlet opening for a mist stream produced in the casing, and contains a fan for producing a flow from the inlet opening to the outlet opening, a liquid supply and a unit for mechanically atomizing the liquid and for mixing the atomized fluid with the air current for the purpose of forming the mist stream.

The apparatus according to the invention also comprises the aforementioned features, but is principally characterized in that the casing of the liquid atomizer has an annular intermediate part fixed to the carrier, is open below and above, and preferably posesses the inlet opening and the outlet opening, that a lower part of the casing serving as liquid supply vessel is detachably arranged at the underside of the intermediate part and that an upper part of the casing removably placed on the upper side of the intermediate part carries the atomizer unit and the fan together with a motor serving to drive the fan and atomizer unit.

This design makes possible, amongst other things, a particularly simple and time-saving maintenance of the liquid atomizer, especially its cleaning, doing away with the necessity of dismantling for this purpose the whole casing from the carrier.

Further features of the object of invention will appear from the following description and claims, taken in conjunction with the accompanying drawing which illustrates, purely by way of example, one preferred form of embodiment of the apparatus according to the invention.

FIG. 3 shows how the atomizer can be dismantled for its maintenance, in representation similar to FIG. 1.

Figure 1:
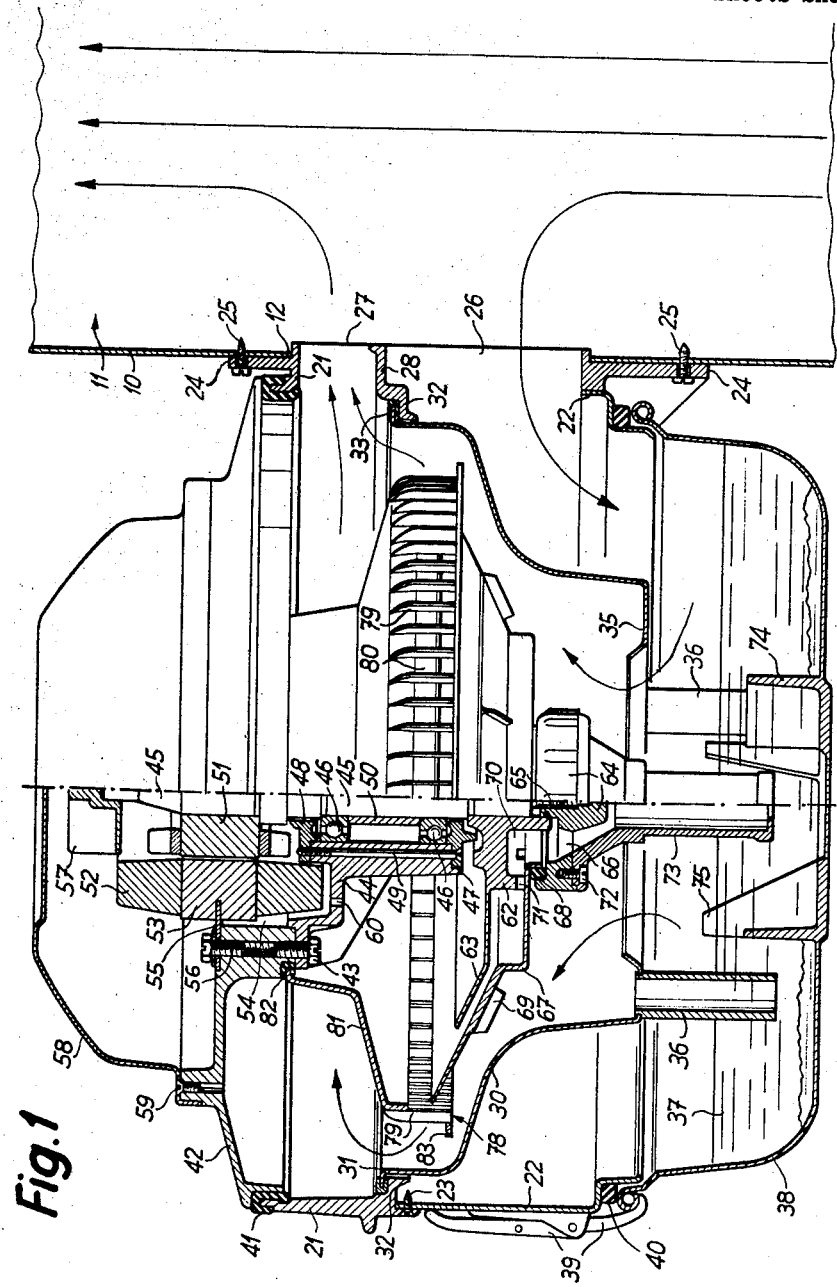
FIG. 1 shows, partly in vertical section and partly in side view, a wall of an air duct and a liquid atomizer attached thereto.
Figure 2:
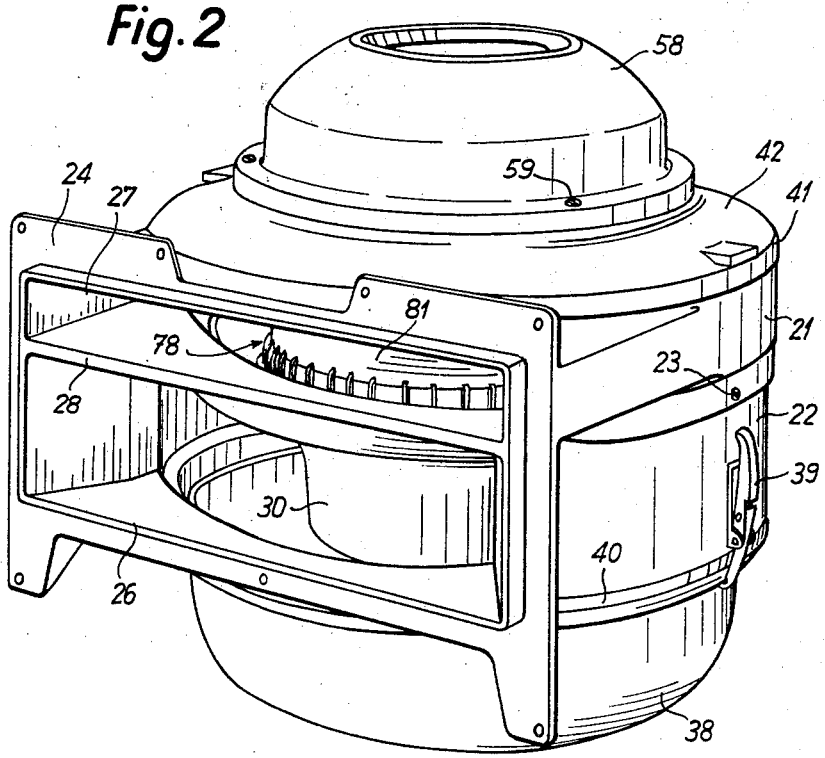
FIG. 2 shows in perspective representation the liquid atomizer alone, seen mainly from the side of the air duct.

Referring to FIGS. 1 and 3, numeral 10 designates one wall of an air duct 11 (otherwise not shown). The air duct leads first, for instance from a hot air stove, vertically upwards to then enter several rooms of a building which have to be heated by means of warm air. Cut out in the wall 10 is a rectangular opening 12 having connected thereto a liquid atomizer which will be dscribed hereinafter.

The casing of the liquid atomizer has a substantially annular intermediate part 21, 22 which is open at the top and bottom and comprises a casting 21 and a sheet iron jacket 22 connected thereto by screws 23, but could equally well consist of a single piece of material. Formed on the casting 21 is a flange 24 which, by means of screws 25, is atached to the peripheral ring of the opening 12 of the air duct wall 10. Within the flange 24, the casting 21 has two substantially rectangular openings which are arranged in superposed relation and separated from each other by a web 28. The lower and larger opening 26 serves as inlet for the air from the air duct 11 into the liquid atomizer, whereas the upper opening 27 serves as outlet for a mist stream produced in the atomizer. Through the opening 12 in the wall 10, the two openings 26 and 27 communicate with the interior of the air duct 11.

Located within the intermediate casing part 21, 22 is a funnel-shaped downwardly taper annular insert 30, being with its upper rim 31 detachably supported on a circular shoulder 32 of the casting 21. The rim 31 of the annular insert 30 has mounted on it a rubber bead, which ensures a tight fit of the annular insert 30 in the casting 21 and an airtight seal between said two parts. The annular insert 30 subdivides the interior of the intermediate casing part 21, 22 into two compartments, one of which communicates with the air inlet opening 26 and the other with the outlet opening 27. Further, above the opening at the lower end of the annular insert 30, the said two compartments intercommunicate.

Around the opening at the lower end of the annular insert 30, there extends an inwardly projecting collecting trough 35 for condensate and other liquid droplets. From the collecting trough some liquid conducting members in the form of tubes 36 lead further downwards to the bottom of a lower casing part 38 serving as supply vessel for the liquid 37 to be atomized, said part 38 being removably fastened to the lower opening of the intermediate part 21, 22 by means of two or more tensioners 39 under interposition of a flexibly yielding sealing ring 40 seated on the sheet-iron jacket 22.

A rim extending around the upper opening of the casting 21 has mounted thereon a flexibly yielding sealing ring 41 on which a cover-like upper part 42 of the casing is removably set. The underside of the upper part 42 has a bearing shield 44 fixed thereto by screws 43, in which shield a vertical shaft 45 is rotatably supported by means of two ball bearings 46. Arranged below and above on the bearing sheld 44 are cover rings 47 and 48 respectively. The lower cover ring 37 carries the outer race of the lower ball bearing 46 and thus the whole shaft 45 with the parts fixed thereon which are described below. The cover rings 47 and 48, interconnected by several screws 49, are pressed against the bearing shield 44. For spacing the two ball bearings 46 apart, the shaft 45 has pushed a sleeve 50 onto it against which rest the inner races of the ball bearings 46 from top and bottom respectively.

A portion of the shaft 45, projecting upwards from the bearing shield 44, carries a squirrel-cage rotor 51 of an A.C. synchronous motor, whose stator iron core 53 provided with a winding 52 is arranged in a central opening 54 of the upper casing part 52 and mounted thereon by means of a carrier ring 55 and several screws 56. Seated on the upper end of the shaft 45 is a fan 57 for cooling the motor 51, 52, 53. A hoodlike lid 58 covers the described motor and is fixed to the upper casing part 42 by means of several screws 59. The lid is flat above, in order to enable the whole upper part of the atomizer to be turned upside down in case of dismantling and cleaning work without running the risk of damaging it. The bearing shield 44 has a small aperture adapted to cause pressure equilibrium between the space housing, the motor and the interior of the atomizer lying below the bearing shield. Thus a pressure difference on the ball bearings 46 will be avoided, which otherwise would be liable to press out the bearing grease.

A portion of the shaft 45 projecting downwards from the bearing shield 44 carries a hub 62 which is designed as flinger disc. The hub 62 is kept against a step of the shaft 45 by means of a screw nut 64. The nut 64 is detachably screwed on a threaded portion 65 of the lower end of the shaft 45 and has several axially throughgoing recesses 66. Arranged between the hub 62 and the screw nut 64 is another larger flinger disc 67 which is centered on the sealing ring 68 of the nut 64 and clamped between said sealing ring 68 and hub 62. At its underside, the flinger disc 67 has several fan blades 69 by means of which an air stream is produced from the intake 26 to the outlet 27. The hub 62 is provided with recesses 70 and 71 which communicate with the aforementioned recesses 66 in the screw nut 64. By means of screws 72, the underside of the screw nut 64 has attached to it a suction branch 73 which is coaxial to the shaft 45 and reaches to the bottom of the lower casing part 38 serving as liquid vessel, thus dipping into the liquid 37 to be atomized.

The bottom of the lower casing part 38 is designed as circular wall which surrounds the suction wall with clearance and serves to keep away from the suction branch 37 any dirt collected on the bottom of the casing part 38. The space encircled by the circular wall 74 contains some stationary blades 75 to suppress rotation of the liquid in the lower casing part. It is understood that the tubular liquid guiding members dip into the liquid 37 outside the circular wall 74.

The periphery of the flinger disc 67 is surrounded by a stationary perforated baffle rim 38 which comprises a large number of substantially radial lamellae 79 having between them passageways 80 for the liquid atomized. The baffle ring 78 is arranged at the lower rim of a bell-shaped part 81, being supported on the atomizer casing by its lower end only, so as to be clamped between the upper casing part 42 and the bearing shield 44, with interposition of a flexibly yielding sleeve which mainly serves for damping noise. The bell-shaped part 81, together with the baffle ring, is preferably made of sound-damping material by the injection or pressure-moulding process. The lamellae are freely accessible from below for convenience of cleaning. An outturned flange ring 83 interconnecting the lamellae 79 ensures adequate mechanical strength of the baffle ring 78 and effects also a favorable guiding of the air stream, thus improving the efficiency of the liquid atomizer.

The flinger discs 63 and 67, baffle ring 68 and suction branch 73 together constitute a unit for mechanically atomizing liquid and for mixing the atomized liquid with the air stream produced by the fan blades 69. The said unit, hereinafter referred to as atomizer unit, is merely attached to the top of the casing, together with the motor 51, 52, 53.

The action of the described humidifying apparatus is as follows: Through the motor 51, 52, 53, the shaft 45 with the flinger discs 63 and 67 and suction branch 73 is set rotating at high speed. The fan blades 69 cause a powerful air stream from the inlet 26 to the outlet 27, whereby a portion of the air flowing through the duct 11 is taken therefrom and directed through the atomizer and then returned into the duct 11. The annular insert leads the admitted air over the surface of the liquid 37 contained in the lower casing part 38 thus already causing a certain humidifying of the air. Within the suction branch 73, the liquid rises high on the wall of the branch 73 and passes then through the recesses 66 of the nut 64 and the recesses 70, 71 into the space between the two flinger discs 63, 67. Especially on the lower and larger flinger disc 67, the liquid is spread to a thin film which is thrown off at the periphery of the disc, passes partly to the perforations 80 of the baffle ring 78 and impinges partly on the lamellae 79 thereof. There arise tiny liquid droplets which are engaged by the already mentioned air stream and mixed with the air to a mist stream. The mist stream thus produced is ejected through the outlet opening 27 into the air duct where it mixes with the rest of the air in the duct, humidifying the same.

Preferably means (not shown) are provided for continually and automatically refilling the lower casing part 38 with liquid to be atomized, say, water. The water piping is connected laterally to the side of the casting 21 near the inlet 26 and provided with a valve controlled in known manner by a float on the liquid supply 37 so as to keep the level of the liquid supply practically constant in the lower casing part 38.

The advantages of the described humidifying apparatus are mainly seen in that the atomizer is capable of being dismantled, cleaned and reassembled in a very simple way without any special skill.

For cleaning the lower casing part 38, serving as liquid vessel, the intermediate casing part 21, 22, may be lifted off simply by loosening the lever clamps 39, without having resort to tools. The cleaning may consequently be carried out in a place, where it can be done best. In operation, dirtying of the atomizer may occur by lime and impurities in the water to be atomized, by algae, by dirt carried along with the air through the duct 11. As mentioned hereinbefore, the circular wall 74 keeps any impurities in the liquid supply 37 away from the suction branch 73.

If it is desired to clean the atomizer unit, the upper casing part 42 with all parts thereon is lifted off the intermediate part 21, 22, the whole is put upside down on the flat end part of the hood-like motor cover 58, whereupon the baffle rim 78 is already accessible for cleaning. But without resorting to any tool, the nut 64 together with the suction branch thereon can be screwed off the shaft 45, whereupon the flinger disc 67 and then also the hub 62 with the flinger disc 23 can be taken off. All component parts of the atomizer unit may thereupon be conveniently and thoroughly cleaned, if necessary, also the annular insert 30 may be lifted off the casting 21 of the intermediate casing part 21 and cleaned. Subsequent to this, the assembly of the atomizer takes place in reverse order to the described operations, and then again no tools are required.

Should the winding 52 of the motor 51, 52, 53, ever be damaged, it may be replaced in a very simple manner as follows: While otherwise the atomizer remains completely assembled, the screws 59 are loosened and then the hood-like motor cover 58 is lifted off the upper casing part 42. Then the screws 56 are loosened, whereupon the whole stator 52, 53, together with the carrier ring 55, can be lifted off axially and be replaced by a new one. The shaft 45 with the squirrel-cage rotor and fan 57 remain thereby unchanged. After inserting the new stator 52, 53 with its carrier ring 55, the screws are replaced and then the motor cover 58 put on and fixed by the screws 59.

When the ball bearings 46 have become worn, at first the upper casing part 42 with all parts thereon is lifted off the intermediate casing part 21, 22, and the whole put upside down onto the end surface of the motor cover 58. Thereupon the nut 64 together with the suction branch 73 are removed from the shaft 45, whereupon also the flinger discs 67 and 65 can be readily taken off. Subsequently the screws 43 are loosened, and the bearing shield 44 together with the parts thereon, especially the shaft 45 and ball bearings 46, can be drawn off axially from the upper casing part 42 and bodily replaced by others. With this also the part 81 having the baffle ring 67 will become free and may be replaced by others if necessary. The reassembly takes place in reverse order to the described operations. Obviously, in the described atomizer each single component part can be removed, substituted and replaced without difficulty, even by unskilled people and outsiders, so as to render servicing and upkeep of the atomizer as simple as can be imagined. Worth mentioning moreover is that, in all described cleaning and service work, the intermediate part 21, 22, of the atomizer casing need not be detached from the air duct 11.

In operation, the atomizer causes but comparatively little noise. An essential reason for this lies in the fact that the baffle ring 78 consists of noise-damping plastic material and is very stable on account of being made by injection moulding technique. Another reason for the practically noiseless operation of the atomizer lies in the annular insert 30 which silently conducts away the condensate that forms and the fluid droplets not carried along in the mist stream into the collecting trough 35, from which the liquid also returns noiselessly to the liquid supply 37, i.e. without any noise of dripping through the piping 36. Advantageously, the hub 62 with the flinger disc 63 as well as the flinger disc 67 with the fan blades 69 may consist of synthetic material, so as to achieve a still further reduction in noise. Through the flexibly yielding sleeve 62, the vibrations of the motor 15, 52, 53, are not transmitted to the bell-shaped part 81 and the baffle ring 78 so that the said vibrations will not be propagated through the mist stream in the air duct 11.

A further advantage is, that the motor 51, 52, 53, is sealed both in the way to the interior of the atomizer as well as to the open air surrounding the same. Thus, the motor is protected on the one hand against dust and moisture from the atmosphere and ensures on the other hand that any burning occurring in the motor cannot pass into the air duct 11.

The described apparatus is not bound to vertically directed portions of the air duct 11. Since the fan blades 69 in any case cause a sufficiently powerful air stream, the atomizer may also be arranged on a wall of a horizontally or obliquely directed portion of the air duct without thereby affecting the action of the apparatus. Since the connection and the valve for automatically feeding the liquid to be atomized are arranged, as mentioned, on the intermediate casing part 21, 22, which, when dismantling the atomizer for cleaning and service work, remains stationary on the wall 10 of the air duct 11, the said valve and the pertinent float are not thrown out of adjustment when the lower casing part 38 serving as liquid supply vessel is removed or again replaced.

It is possible to have the casing of the atomizer provided with several inlet openings and outlet openings. If necessary, the outlet openings for the mist stream may be arranged at the top 42 of the casing. The inlet opening and outlet opening may communicate with separate ducts or spaces.

It is understood that various changes and modifications may be made in the embodiment illustrated and described wtihout departing from the scope of the invention as defined in the following claim.

What I claim is:

Apparatus for humidifying air comprising an upright cylindrical main casing having an annular cross section, inlet means and outlet means in the side wall of said casing, said outlet means being located immediately above said inlet means, flange means surrounding and extending outwardly from said inlet and outlet means, said main casing having an integral rim extending around the upper periphery thereof, an annular cover member removably mounted on said rim and having a central aperture therethrough, annular motor stator means mounted in said aperture of said cover member, said stator means extending above and below said cover member, a shaft, bearing shield means mounted on the lower side of said cover member coaxially with said stator means, bearing means for mounting said shaft coaxially within said shield means and said stator means, said shaft extending upwardly through and being spaced from said stator means, said shaft also extending downwardly through said shield means below said outlet means, annular motor rotor means secured on said shaft and coextensive with said stator means, said shaft being solely supported by said bearing means below said rotor means, an annular disc, means for mounting said disc on said shaft substantially transverse thereto below said shield means and said outlet means, radial blade means on the lower surface of said disc, intermediate, annular casing means mounted on the lower portion of said main casing in spaced and surrounding relationship to said disc, lower liquid storage tank means removably mounted on the lower periphery of said intermediate casing means, annular, bell-shaped wall means secured to the lower side of said cover member and flaring outwardly and downwardly therefrom, baffle ring means on the outer periphery of said bell-shaped wall means surrounding and spaced from the outer periphery said disc, suction tube means on the lower end of said shaft and extending into said liquid storage tank means, liquid passage means communicating said tube means and the upper side of said disc, funnel-shaped, downwardly tapered, partition means surrounding said tube means, blade means, disc and baffle ring means to provide an air flow path from said air inlet means adjacent said tube means, blade means, disc, and baffle ring means to said air outlet means, whereby upon rotation of said shaft liquid will be raised by said tube means and sprayed by said disc through said baffle ring means into an air stream being pumped through said main casing by said blade means to humidify said air stream.

References Cited in the file of this patent

UNITED STATES PATENTS

| | | |
|---|---|---|
| 2,189,021 | Schury | Feb. 6, 1940 |
| 2,766,027 | Herr | Oct. 9, 1956 |
| 2,874,797 | Flury | Feb. 24, 1959 |
| 2,984,464 | Herr | May 16, 1961 |

FOREIGN PATENTS

| | | |
|---|---|---|
| 483,876 | Great Britain | Apr. 27, 1938 |